United States Patent Office 3,356,739
Patented Dec. 5, 1967

3,356,739
CONVERSION OF NON-BRIDGEHEAD HYDROXY-ADAMANTANE COMPOUNDS
Abraham Schneider, Overbrook Hills, Pa., assignor to Sun Oil Company, Philadelphia, Pa., a corporation of New Jersey
No Drawing. Filed Sept. 10, 1964, Ser. No. 395,556
7 Claims. (Cl. 260—617)

This invention relates to the isomerization of non-bridgehead hydroxy adamantane compounds to bridgehead hydroxyadamantane compounds by means of a concentrated mineral acid. The isomerization is applicable to 2-hydroxyadamantane and to any of its higher homologues having 11 to 18 total carbon atoms and having at least one unsubstituted bridgehead position in the adamantane nucleus. The product of the isomerization is the bridgehead monoalcohol resulting from a shift of the hydroxyl group to an open bridgehead position of the starting material.

The carbon nucleus of adamantane (tricyclo[3.3.1.1$^{3,7}$]decane) contains ten carbon atoms arranged in a completely symmetrical, strainless manner such that four of the carbon atoms occupy bridgehead positions in the rings. The structure of adamantane is often depicted typographically as follows:

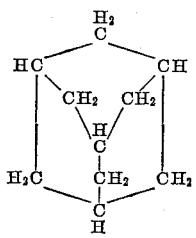

All four bridgehead carbons are equivalent to each other and likewise all rings are equivalent.

In J. Org. Chem., vol. 26, pages 2207–2212 (1961) the oxidation of adamantane by means of air at elevated pressure has been described. The principle oxidation product was 1-hydroxyadamantane but adamantanone was also produced in substantial amounts. In my copending applications Ser. Nos. 395,557 and 395,580, filed of even date herewith, the oxidation of various alkyladamantanes by means of air or oxygen under conditions which primarily yield the 1-hydroxy derivatives but also a substantial amount of the ketone derivatives has been described. As disclosed in above application, Ser. No. 395,557, the alcohols of the invention can be used as plasticizers or as intermediates for preparing mixed esters containing alkyladamantane moieties.

The ketones made in the foregoing oxidations can be hydrogenated to produce non-bridgehead monoalcohols, i.e., the monools in which the hydroxyl group is attached to a carbon atom of the adamantane nucleus other than one of the four bridgehead carbon atoms.

It has now been found that these non-bridgehead monoalcohols can readily be converted to the bridgehead isomer. This can be done by dissolving the non-bridgehead hydroxyadamantane compound in a concentrated mineral acid which is either sulfuric acid or phosphoric acid, allowing adequate time for isomerizaton to occur and then recovering the resulting bridgehead isomer from the reaction mixture. Such recovery can be effected merely by diluting the mineral acid solution with enough water to cause the bridgehead monoalcohol to precipitate from solution and separating the precipitate.

The present isomerization procedure is applicable to the conversion of 2-adamantanol to 1-adamantanol and to the conversion of any $C_{11}$–$C_{18}$ non-bridgehead hydroxyalkyladamantane that has an unsubstituted bridgehead position. These compounds can have one or several alkyl groups attached at either bridgehead on non-bridgehead positions provided that at least one bridgehead position is left open so that the hydroxyl group can be shifted to it. For example, non-bridgehead alcohols corresponding to any of the hydrocarbons named below (the symbol A being used to mean the adamantane nucleus) can be isomerized according to the present invention: 1-methyl A; 2-methyl A; 1-ethyl A; 2-ethyl A; 1,3-dimethyl A; 1-methyl-3-ethyl A; 1,3,5-trimethyl A; 1,3-dimethyl-5-ethyl A; 1-n-butyl A; 1,3-diisobutyl A; 1-n-hexyl A; 1-ethyl-3-hexyl A; and 1-n-octyl A. For each of these hydrocarbons there are two or more possible non-bridgehead hydroxy derivatives in which the hydroxy group is attached to the adamantane nucleus rather than to the alkyl groups. Any of such derivatives can be isomerized according to the present invention to produce the bridgehead hydroxy isomer.

As previously stated the mineral acid used to effect the isomerization can be either concentrated sulfuric acid or concentrated phosphoric acid. In the case of sulfuric acid the concentration should be at least 90% $H_2SO_4$ by weight and the isomerization can be effected at any temperature in the range of 0–150° C. and more preferably 15–80° C. When phosphoric acid is used, the concentration should be at least 85% $H_3PO_4$ by weight and the temperature should be in the range of 75–150° C. Sulfuric acid is preferred for effecting the reaction. The weight ratio of acid to the non-bridgehead monool can vary widely such as from 1:10 to 20:1 but ratios of 1:2 to 4:1 generally are preferred. In any event the conditions employed should be such that the monool dissolves in the acid so that the reaction mixture is a single phase. When sulfuric acid is used, the non-bridgehead monool can be dissolved therein at room temperature and the mixture allowed to stand until isomerization is complete. Alternatively the mixture can be heated to expedite the isomerization. When concentrated phosphoric acid is used, an elevated temperature above 75° C. is required to cause dissolution of the monool in the acid.

After the isomerization reaction is complete, the reaction mixture is diluted wtih water in amount sufficient to cause all of the bridgehead alcohol to precipitate. Generally the addition of an equal volume of water will be adequate. Preferably cold water or ice is used to prevent the acid mixture from becoming too hot due to heat of dilution. The bridgehead alcohol precipitates as a separate phase which may initially resemble an oil but which upon standing may crystallizse. A convenient procedure for handling this product is to add ether to the acid mixture after dilution and separate the bridgehead alcohol as a solution in ether. The solution can then be dried by means of $Na_2SO_4$ or other suitable desiccant and the ether evaporated to obtain the bridgehead alcohol product.

The following example illustrates the invention more specifically:

Example

The isomerization reaction was carried out on a mixture composed by weight of about 70% 1-hydroxy-3,5-dimethyladamantane and 30% of isomeric material in which the hydroxyl group is attached to non-bridgehead nuclear carbon. There are four possible non-bridgehead isomers, and it was not determined how many of these isomers were present. This charge mixture has been obtained by oxidizing 1,3-dimethyladamantane (here referred to as "DMA") with air at 166–188° C. in the presence of 0.005% of cobalt naphthenate as catalyst, separating a distillate fraction containing about 70% of the bridgehead alcohol and about 30% of monoketo isomers, and then hydrogenating this fraction by means of sodium borohydride in aqueous methanol solution. The resulting mixture of DMA alcohols amounting to 4.3 g. was dissolved in 10 g. of 96% sulfuric acid. The solution was warmed to 50° C. for 10 minutes and was then cooled and poured over ice. Diethylether was added to dissolve the bridgehead DMA alcohol which had precipitated, the ether solution was dried by means of $Na_2SO_4$ and the ether was evaporated. Substantially pure 1-hydroxy-3,5-dimethyladamantane having a melting point of 94° C. was obtained.

The foregoing example shows that non-bridgehead alcohols of DMA can readily be isomerized to 1-hydroxy DMA. Substantially analogous results can be obtained when the starting material is 2-adamantanol or the non-bridgehead alcohol derivatives of any of the other alkyladamantanes as herein specified. Likewise analogous results are obtained by substituting concentrated phosphoric acid for sulfuric acid and using a higher temperature.

The invention claimed is:

1. Method of isomerizing non-bridgehead hydroxyadamantane compounds which comprises dissolving in a concentrated mineral acid selected from the group consisting of sulfuric acid having a strength of at least 90% $H_2SO_4$ and phosphoric acid having a strength of at least 85% $H_3PO_4$ a hydroxyadamantane compound having 10–18 carbon atoms and selected from the group consisting of 2-hydroxyadamantane and 2-hydroxyalkyladamantanes having at least one unsubstituted bridgehead position, the weight ratio of mineral acid to said compound being in the range of 1:10 to 20:1 and the temperature of the mixture being in the range of 0–150° C., whereby the hydroxy group shifts to the bridgehead position, and recovering from the acid a 1-hydroxyadamantane compound.

2. Method according to claim 1 wherein said acid is concentrated sulfuric acid having an $H_2SO_4$ content above 90% by weight.

3. Method according to claim 2 wherein the temperature of the mineral acid solution is in the range of 15–80° C.

4. Method according to claim 3 wherein the weight ratio of concentrated mineral acid to said hydroxyadamantane compound is in the range of 1:2 to 4:1.

5. Method according to claim 1 wherein said acid is concentrated phosphoric acid having an $H_3PO_4$ content above 85% by weight.

6. Method according to claim 5 wherein the temperature of the mineral acid solution is in the range of 75–150° C.

7. Method according to claim 6 wherein the weight ratio of concentrated mineral acid to said hydroxyadamantane compound is in the range of 1:2 to 4:1.

References Cited

Schleyer et al., J. Am. Chem. Soc., vol. 83, pp. 182–7 (1961).

LEON ZITVER, *Primary Examiner.*

BERNARD HELFIN, *Examiner.*

T. G. DILLAHUNTY, *Assistant Examiner.*